United States Patent [19]

Nadir et al.

[11] 4,430,755
[45] Feb. 7, 1984

[54] PORTABLE RADIO TELEPHONE

[75] Inventors: Mark Nadir, Fort Lauderdale; Gordon W. James, Plantation; William J. Kuznicki, Coral Springs; Jerome A. Nieds, Margate, all of Fla.

[73] Assignee: Motorola, Inc., Schaumburg, Ill.

[21] Appl. No.: 263,797

[22] Filed: May 14, 1981

[51] Int. Cl.³ .............................................. H03J 7/18
[52] U.S. Cl. ........................................ 455/77; 455/35; 455/166; 179/2 EB
[58] Field of Search ............... 179/2 E, 2 EA, 2 EB, 179/2 EC; 455/31, 38, 54, 56, 76–79, 82, 83, 32, 35–37, 161, 166

[56] References Cited

U.S. PATENT DOCUMENTS

| | | | |
|---|---|---|---|
| 3,173,996 | 3/1965 | Rypinski, Jr. | 179/41 |
| 3,286,184 | 11/1966 | Blitchington, Jr. | 325/16 |
| 3,351,714 | 11/1967 | Kunzelman et al. | 179/2 EB |
| 3,377,435 | 4/1968 | Lippert | 179/41 |
| 3,535,636 | 10/1970 | Muilwijk | 325/25 |
| 3,555,424 | 1/1971 | Malm | 325/53 |
| 3,564,150 | 2/1971 | Muller | 179/41 |
| 3,711,647 | 1/1973 | Boyer | 179/2 E |
| 3,729,595 | 4/1973 | Sarati et al. | 179/41 A |
| 3,808,537 | 4/1974 | Sarati et al. | 179/2 EB |
| 3,840,811 | 10/1974 | Blouch | 325/55 |
| 3,894,194 | 7/1975 | Frost | 179/41 A |
| 3,898,390 | 8/1975 | Wells et al. | 179/41 A |
| 3,906,166 | 9/1975 | Cooper et al. | 179/41 A |
| 3,943,444 | 3/1976 | Lundberg | 325/25 |
| 3,946,315 | 3/1976 | Tustison | 325/55 |
| 4,009,442 | 2/1977 | Von Bromssen | 455/166 X |
| 4,012,597 | 3/1977 | Lynk, Jr. et al. | 179/41 A |
| 4,013,958 | 3/1977 | Spayth | 325/55 |
| 4,069,454 | 1/1978 | Winkelmann | 325/25 |
| 4,090,036 | 5/1978 | Stott et al. | 179/15 BY |
| 4,096,440 | 6/1978 | Okasaka | 325/53 |
| 4,103,106 | 7/1978 | Sechan | 179/2 EB |
| 4,130,731 | 12/1978 | Bolgiano et al. | 179/2 EB |
| 4,138,595 | 2/1979 | Barkwith | 179/2 E |
| 4,166,927 | 9/1979 | Hamaoki | 179/2 EB |
| 4,233,473 | 11/1980 | Frost | 179/2 EB |

Primary Examiner—G. Z. Rubinson
Assistant Examiner—W. J. Brady
Attorney, Agent, or Firm—James E. Jacobson; Edward M. Roney; James W. Gillman

[57] ABSTRACT

A system for radio-telephone communication between a user at a remote location and the commercial telephone system or between two users at remote locations comprises a fixed terminal that is connected by wire lines or the like to the commercial telephone system and a plurality of portable radio units. The terminal is equipped for duplex operation on a plurality of channels, each of which uses separate frequency bands for transmitting and receiving. Each of the portable units is a simplex transceiver adapted to receive on each of the frequencies of transmission from the terminal and to broadcast on each of the frequencies received by the terminal. The terminal places a channel acquisition tone on an unused channel that is the next to be used. The terminal calls portable unit by shifting channel acquisition tone to another channel and broadcasting an identifier to the portable unit. The called portable unit responds to its individual identifier by sounding an audible alert and producing an audible verbal message if one is sent from the terminal. A portable can also originate a message by calling the terminal. A delay period provides time for the portable to recognize its identifier before beginning to scan for channel acquisition tone. Circuits and logic in the portable produce a busy signal if the user attempts to call at a time when the portable is not receiving channel acquisition tone. A reset in the portable unit provides means for the user to terminate the call.

3 Claims, 11 Drawing Figures

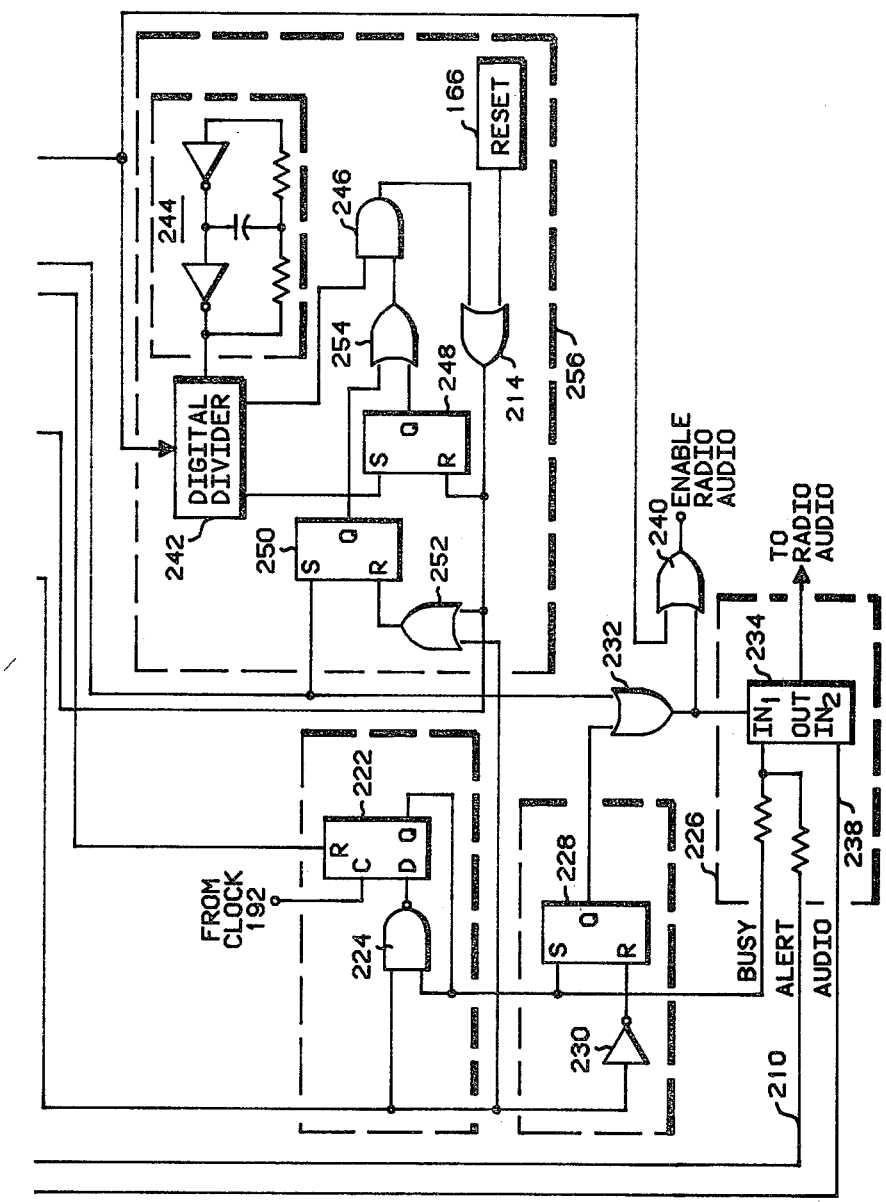

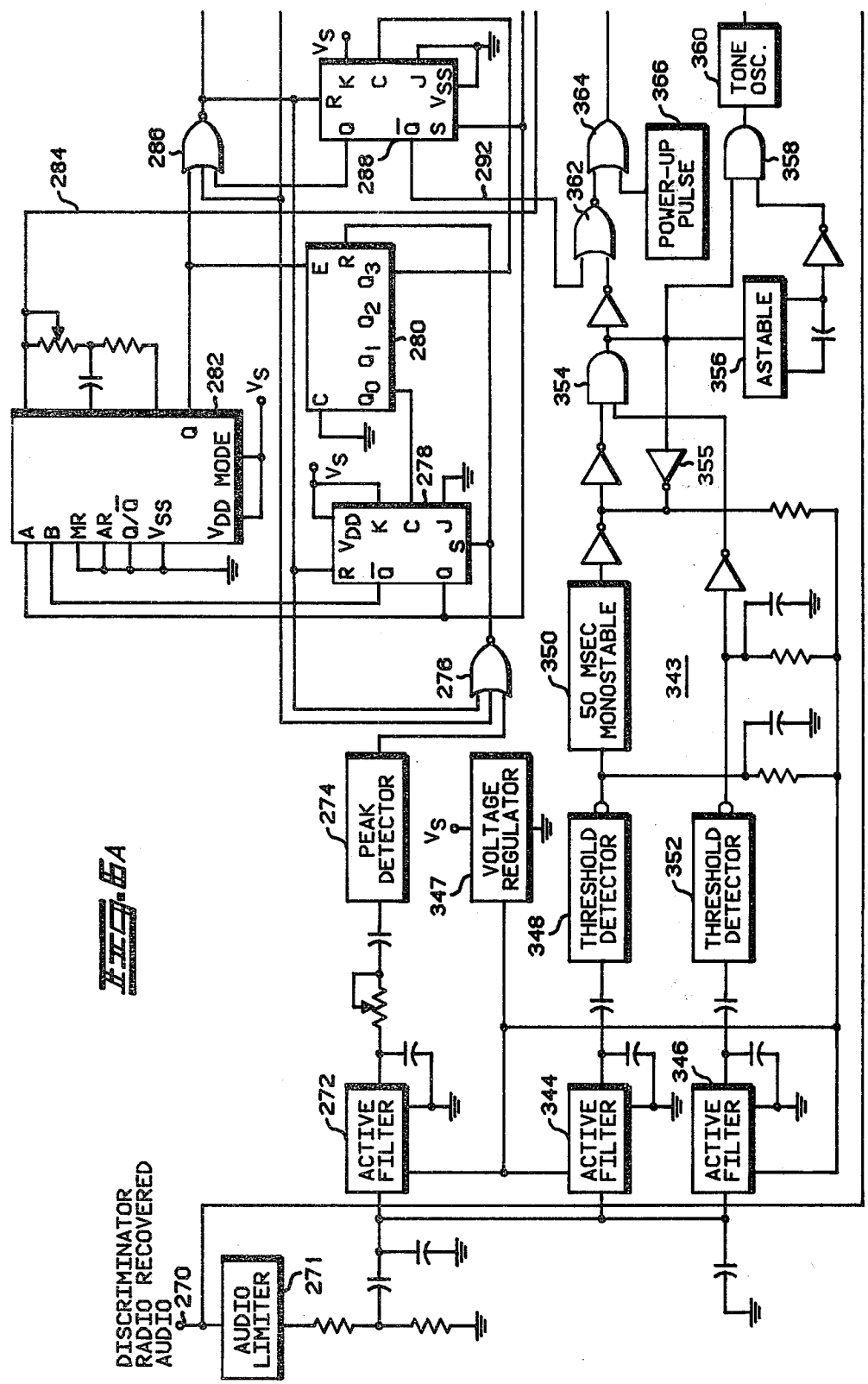

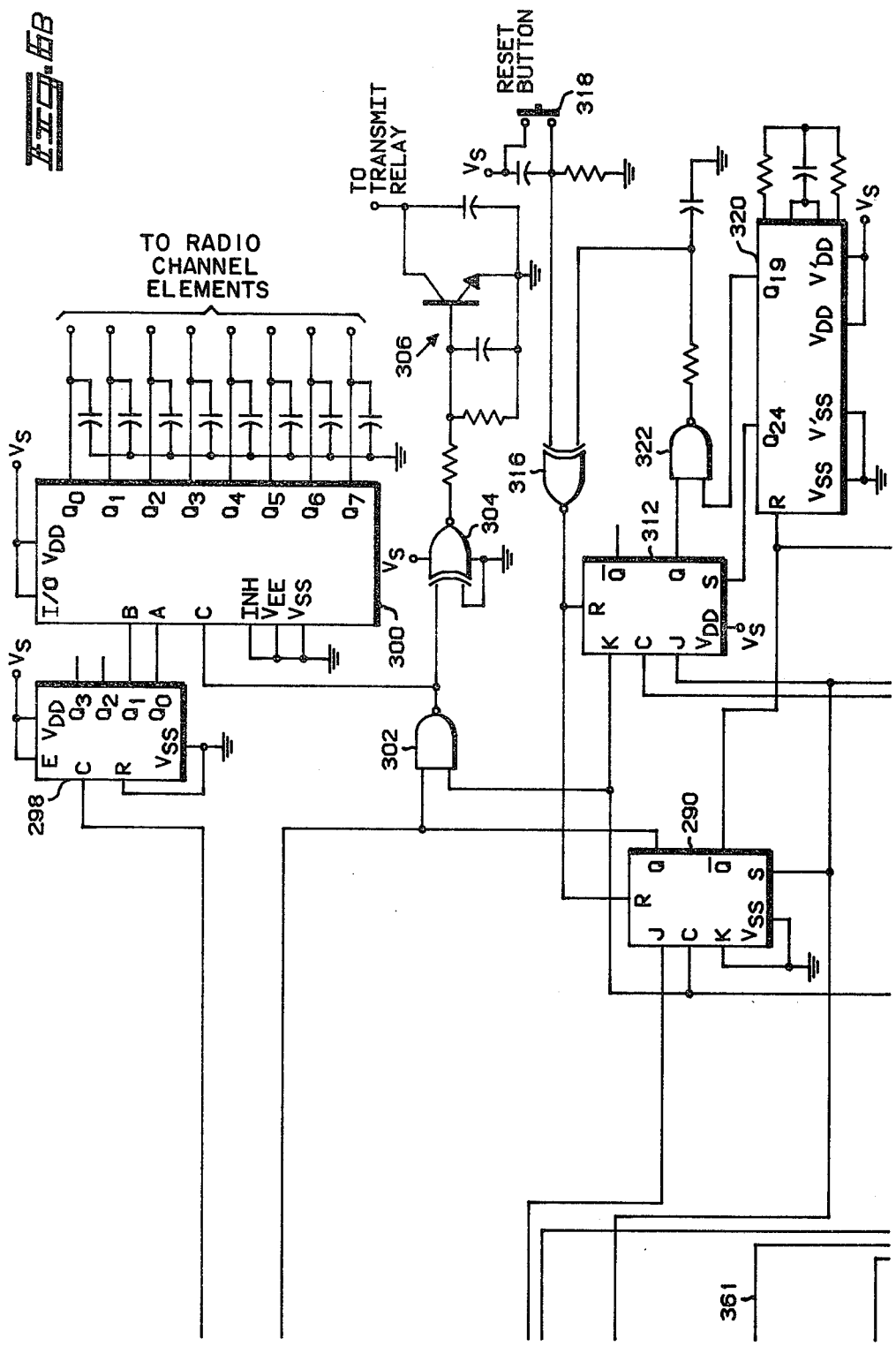

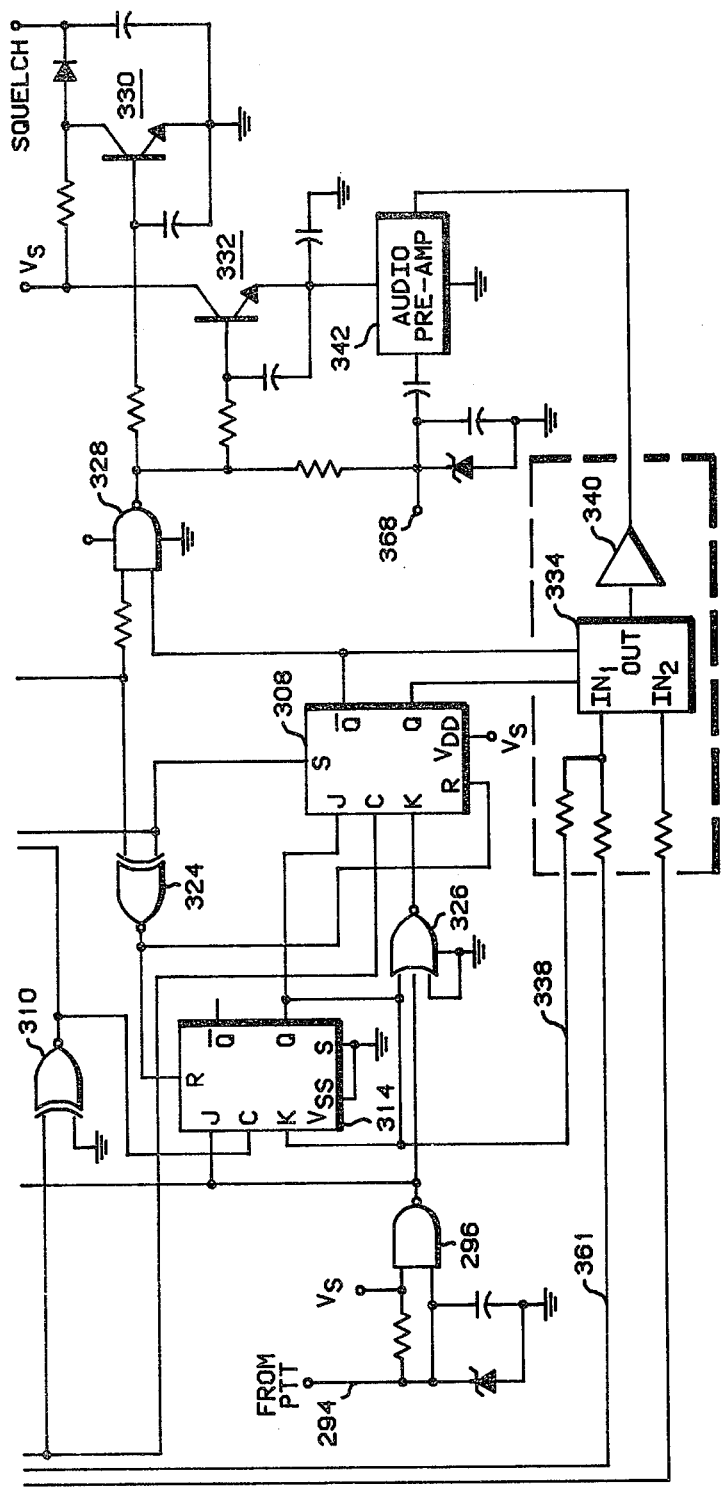

PORTABLE RADIO TELEPHONE

BACKGROUND OF THE INVENTION

This invention relates to portable radio telephone systems. In particular, it relates to portable radio units that are adaptable for connection through a terminal to provide service into the commercial telephone system.

A portable radio telephone is a unit that enables a user to establish wireless connection from essentially any location in a designated service area into the commercial telephone system. The word portable is used in this sense to describe units that can readily be carried on the person as distinct from mobile units which are typically connected to and powered from a vehicle of some sort. Examples of the latter include mobile telephones which extend telephone service to subscribers in vehicles.

Existing mobile telephone systems may provide telephone-like operation. For example, the mobile telephone can initiate and receive calls, it can be identified automatically when it initiates or receives a call, and it can select an available channel automatically from a plurality of channels. However, the presence of a vehicle to serve as a conveyance and the availability of power from the electrical system of the vehicle eases restrictions on the power requirements and size of a mobile telephone. Existing mobile telephones and the systems they operate in are not readily adaptable to portable operation where small size and low power are of the essence. A portable radio-telephone system which provides operation similar to that of existing mobile telephones must of necessity operate differently.

Present-day needs for communication are turning increasingly to the notion that communication should be to and from an individual at his location rather than to a vehicle. The user of a portable radio telephone will also be served best by a unit that operates as much as possible like a telephone so that the user is a telephone caller rather than a radio operator. The portable radio telephone must also be light enough to carry and must be powered adequately for normal use by batteries that can be recharged once a day.

Radio Common Carriers (RCC's) are licensed by the Federal Communications Commission to provide service between radio units and the commercial telephone system. At present RCC's provide portable radio service of several types. The most common is paging where a portable radio which contains only a receiver can receive tone signals or voice messages but cannot talk back. Some systems allow portable transceivers to initiate calls but not receive them. A transceiver is defined here as a combination transmitter and receiver, with or without elements that are common to the transmit and receive paths. Other systems allow portable transceivers to initiate or receive calls but lack essential features of a complete radio telephone system such as automatic channel selection, automatic identification and provisions to prevent users from interfering with each other. The availability of a complete portable radio telephone system will allow RCC's to offer improved service to their subscribers. Other uses by private individuals are also anticipated.

Portable transceivers are widely used for communications in police, industrial, utility and other fleet applications where large groups of users share common concerns. Message traffic on such a communications system is of general interest to all users on the system and it is common practice for all users to monitor broadcasts from a base station or dispatcher and to respond if they are called. Likewise, they must monitor for channel activity before transmitting to prevent interference to communications which may already be in process. In many cases the channel is shared with other fleets or services which often requires monitoring of unrelated message traffic by members in all fleets. These are compromises which commercial users are willing to tolerate. This, however, is not true for the users of radio telephone equipment. By contrast, their message traffic is private and of no concern to other users. Consequently, monitoring is not desirable since it is often viewed as annoying and inconvenient. This necessitates some form of automatically notifying the user of a call intended for him. In a similar fashion, the capability for a user to originate message traffic must also be controlled to prevent inter-user interference. If several channels are to be used it is desirable to have some means of automatic selection of the channel to be used for communication. Automatic channel selection also improves the efficiency of a crowded communications medium. As noted before, many mobile telephone systems provide these features but the capability does not yet exist in a portable radio telephone.

It is an object of the present invention to provide a portable radio-telephone unit.

It is a further object of the present invention to provide a system of communication between commercial telephone systems and users at locations that lack electric power.

It is a further object of the present invention to provide a close approximation to telephone service at a portable transceiver.

It is a further object of the present invention to provide a light and inexpensive portable radio telephone for use in the system of a radio common carrier.

Other objects will become apparent in the course of a detailed description of the invention.

SUMMARY OF THE INVENTION

A system for radio-telephone communication between a user at a remote location and the commercial telephone system or between two users at remote locations comprises a fixed terminal that is connected by wire lines or the like to the commercial telephone system and a plurality of portable radio units which may be located anywhere in the designated service area. The terminal is equipped for duplex operation, transmitting and receiving simultaneously on any or all of a plurality of channels. The terminal applies a channel acquisition tone that is broadcast on one channel to identify or mark it as the next channel to be used for communication. The terminal automatically switches the tone to another channel when the marked channel is taken for the purpose of communication. The terminal also handles subscriber identification, placement of calls to or from users equipped with portable radio units, call timing and billing, and, if desired, selective signalling of individual portable units without a subsequent two-way conversation.

The portable units are simplex transceivers. They can transmit or receive, but cannot do both simultaneously. Each portable unit stands by, ready to transmit or receive on the channel containing the channel acquisition tone. To place a call, the portable radio unit sends an automatic number identification (ANI) signal on that channel to the terminal. If the terminal determines that the ANI signal is valid, it places a dial tone on the channel and allows the portable unit to dial the number of the party to be called. Meanwhile, the terminal has shifted the channel acquisition tone to an empty channel and all other portable units in the system, after a time delay, begin scanning channels until they find the new channel marked with the channel acquisition tone. In the event that all channels are in use, the channel acquisition tone will be placed on the first channel to become available. Each portable unit contains, in addition to its transmitting and receiving equipment, other equipment relating to its function as a portable radio telephone.

A dual-tone-multi-frequency (DTMF) keypad is used in the portable unit for dialing calls and for turning on the ANI generator. The ANI generator causes a sequence of DTMF tones to be transmitted automatically. A unique sequence of tones can be assigned to each portable unit in the system. Channel scanning equipment is used to change both transmit and receive frequencies, allowing the portable unit to scan all the channels available to the system. An acquisition-tone decoder allows the portable unit to determine whether it is receiving the channel acquisition tone. A push-to-talk (PTT) switch allows the user to indicate that call initiation or transmission during an established call is desired.

Tone generating equipment produces distinctive audio signals to indicate that transmission has been attempted while the portable unit is not receiving the channel acquisition tone (channels busy signal), and also that the portable unit has received a call from the terminal (call alert signal). Individual identification equipment in each portable unit allows the terminal to signal that portable exclusively. Audio switches allow control of the audio signal at the speaker. There are four possibilities: no audio, receiver audio output, call alert signal, or channels busy signal.

Overall operation of the portable unit is controlled by a combination of logic circuit means and timers. These determine when to scan, when to stop scanning, when to allow call initiation, when an incoming call has been received, what audio is to be routed to the speaker and the duration of time allowed for a call or for answering a call.

In addition to the PTT switch, the portable unit has two other user controls. A volume control sets the audio level from the speaker, and also has an off position for turning the portable unit off. A reset button is used to return the radio to its channel scanning mode and turn off the audio at the completion of a call.

BRIEF DESCRIPTION OF THE DRAWINGS

FIGS. 5a and 5b are a gate representation of a logical implementation of the flowchart of FIG. 2.

FIGS. 6a, 6b, and 6c are a detailed circuit diagram of the logic portion of the portable transceiver of the present invention.

FIG. 7 is a layout key for FIG. 6.

DETAILED DESCRIPTION OF THE INVENTION

Figure 1:
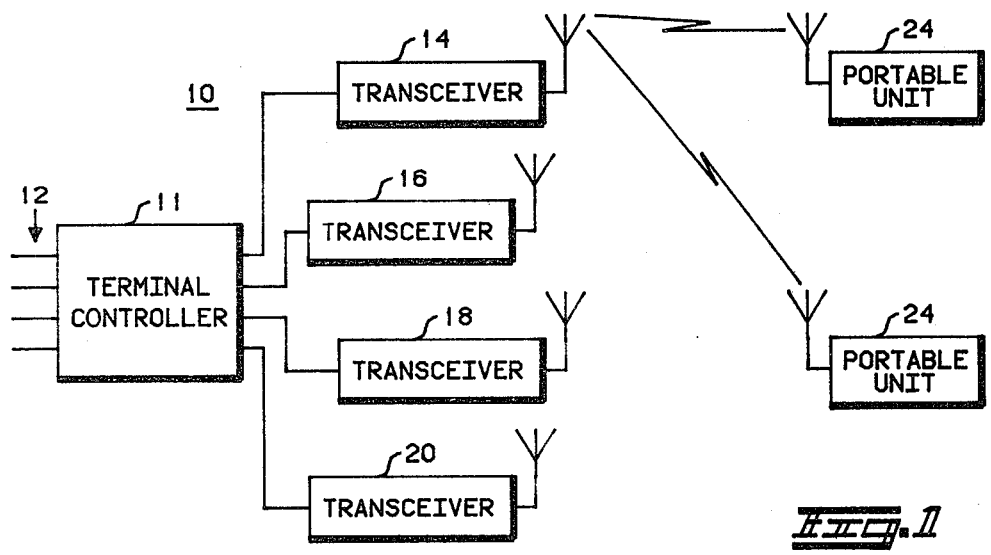
FIG. 1 is a functional block diagram of the principal elements of the system of the present invention.

FIG. 1 is a functional block diagram of the radio telephone system of the present invention. In FIG. 1 a terminal 10 is connected through a plurality of telephone lines 12 to the commercial telephone system. Terminal 10 includes a terminal controller 11 that controls a plurality of transceivers 14, 16, 18 and 20. Four such transceivers are shown here as typical of the situation where terminal 10 controls four different channels. Each transceiver 14-20 is equipped for duplex use, simultaneously broadcasting in one frequency band and receiving in a different frequency band. A channel comprises two frequencies, one that is exclusively for transmission by the portable and another that is used exclusively for reception by the portable unit. Logically, the terminal usage of the frequencies is the inverse of the portable usage. This pair of frequencies is assigned as a single channel by a regulatory agency. In the U.S. this agency is the Federal Communications Commission. In the system of FIG. 1 it will be seen that at least one of the transceivers 14-20 will always be in operation, and under some circumstances all of those transceivers may be in operation. These circumstances will be made clear in the description that follows.

The purpose of the system of FIG. 1 is to effect telephone communication through terminal 10 between the telephone system and a plurality of portable units 24. Each portable unit 24 is a simplex transceiver capable at any one time either of receiving a signal at one of the broadcast frequencies controlled by terminal 10 or of transmitting at one of the corresponding frequencies that comprises the other half of a channel. Each portable unit 24 has the capability of scanning in frequency to have access to all of the channels that are under the control of terminal 10. This number is a matter of design choice.

Figure 2A:
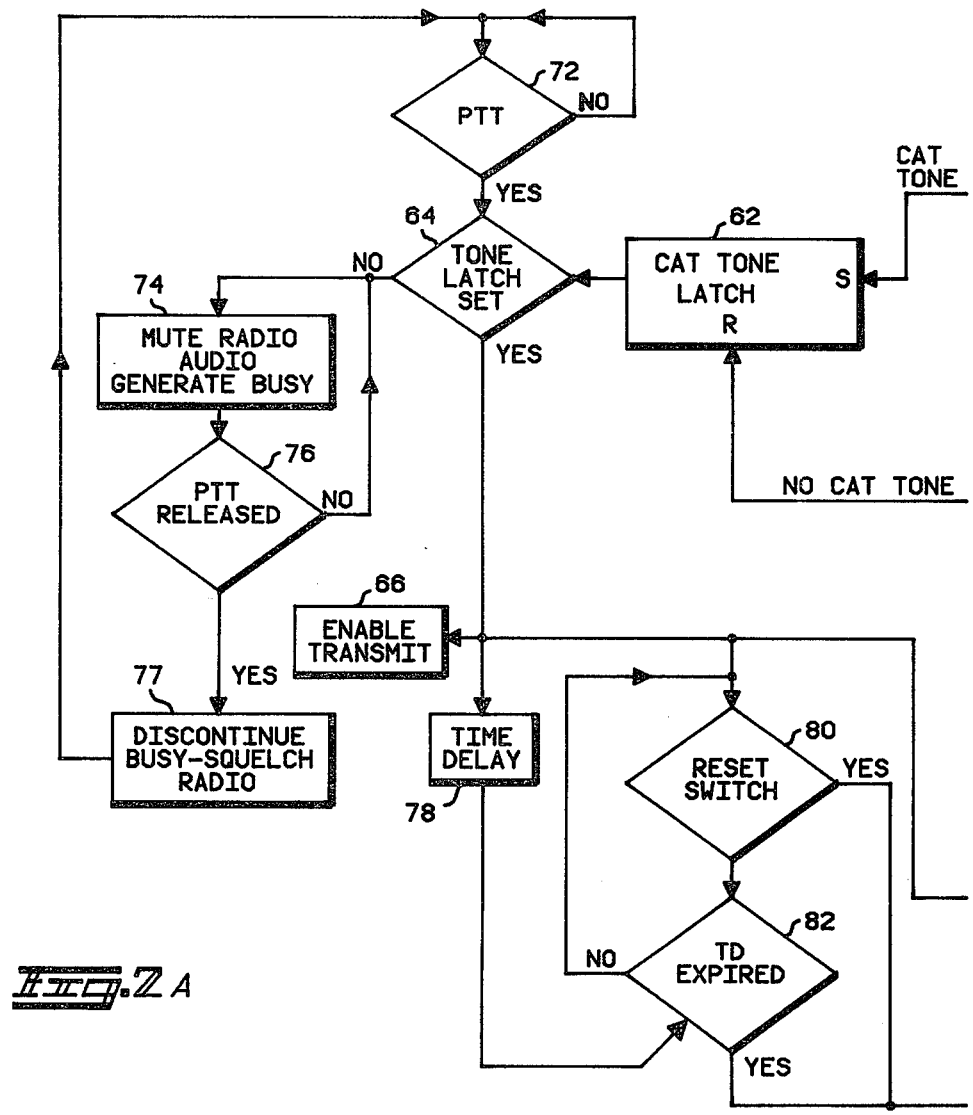
FIGS. 2a and 2b are a logical flowchart of the operating protocol of the portable radio transceiver of the present invention.
Figure 2B:
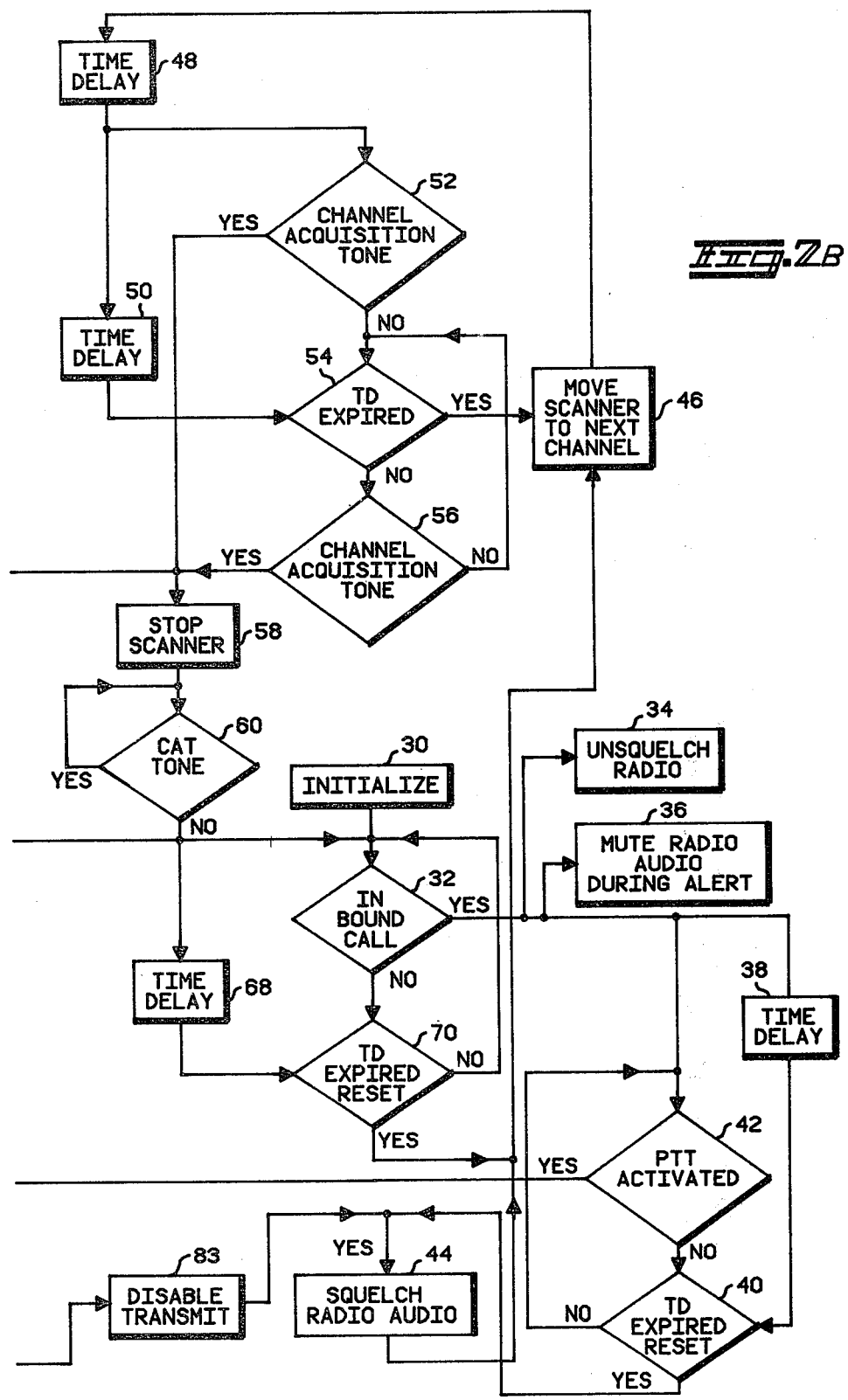

FIG. 2 is a flowchart that shows the operation of the portable units 24 of FIG. 1. The steps of the flowchart of FIG. 2 contain a sequence of events and a set of time delays that have been used in the Motorola MT-500 Improved Portable Telephone System (IPTS), a portable radio-telephone embodying the present system. It should be understood, however, that different sequences of operation or different time delays, or both, could be used in the practice of the invention, if called for, to adapt to different terminals. Such changes are matters of design choice in the practice of the invention. As shown in FIG. 2, operation of the portable unit begins with the step initialize 30. This typically comprises rotating the knob of a combined switch and potentiometer to turn the portable unit on and set the volume. When the unit is turned on, control enters the flowchart of FIG. 2 at decision block 32. This tests for the presence of an inbound call or page, but the initialization procedure appears to the unit like an inbound call. The unit will come up on a randomly chosen channel and will make an audible presentation of whatever is on that channel. This may be one of three things: an ongoing telephone conversation, a channel acquisition tone, or noise that indicates an empty channel. Exit from decision block 32 is thus with a "yes", enabling unsquelch 34. In this context, unsquelch means electronically enabling the audio stages of the radio receiver which lets the user of the portable unit hear the receiver audio. Muting, a term to be used shortly, means electronically switching off the receiver audio and selecting either an alert tone or a busy tone as the input to these audio stages. Upon power-up the paging decoder will respond just as if the portable unit had received an inbound call. The decoder will generate a short call alert tone which will mute the receiver audio until the alert tone ceases. Thus, when the portable unit is first turned on a short alert tone will be present, followed by receiver audio. The muting operation 36 assures that while alert tone is present radio audio is not.

The "yes" information from decision block 32 activates time delay 38 which is typically set to ten seconds to allow time to answer a call. During that time decision block 40 tests for either the expiration of the time of time delay 38 or a reset. If there is no reset or if time delay 38 has not expired, decision block 42 tests whether the push-to-talk button has been activated. If it has not, nothing further happens until time delay 38 expires or the reset button is pressed. At this time, squelch block 44 squelches the audio of the radio receiver and control passes to scan block 46. Frequencies of both transmitting and receiving are shifted to the next channel in sequence and time delay 48 is activated. This is a time delay of approximately 250 milliseconds to settle receiver transients. Time delay 48 is called receiver guardband. Next, time delay 50 is enabled, and control passes to decision block 52 which tests for the presence of a channel acquisition tone in any signals received by the receiver. The channel acquisition tone is typically a sinusoid of a fixed frequency such as 2 kilohertz that is applied by the terminal 10 of FIG. 1 to modulate an RF carrier on a channel that is not presently in use for communication. The receiving portable units are capable of recovering and decoding this information. The channel acquisition tone marks the next channel that will be used for communications. The nature of the communications will be one of three possibilities: the terminal calling a designated portable unit, the paging of a portable unit for terminal outbound messages only, or the processing of a call originated by a portable unit.

Assume first that there is no channel acquisition tone and that time delay 50 has not expired. Control passes to decision block 54, thence to decision block 56. Control is then a closed loop through decision blocks 54 and 56 until time delay 50 expires. The user of the radiotelephone has no reason to be aware of what is happening internally because his audio has been squelched and he receives no indication of the effectiveness of the time delay unless he tries to make an outgoing call. We will consider this possibility later. Meanwhile, suppose that the channel to which the portable unit is tuned does not receive the channel acquisition tone before the expiration of time delay 50. When time delay 50 expires control will exit from decision block 54 to scan block 46. This enables the scanner to move the portable unit to the next channel. After another time delay 48, decision block 52 again tests for the presence of a channel acquisition tone. If there is none, the process just described is repeated and the scan continues after appropriate time delays until the portable receives and detects a signal that contains the channel acquisition tone. If this happens after the expiration of time delay 48 but before the expiration of time delay 50, exit from the scan loop is through decision block 56. If channel acquisition tone is present when time delay 48 expires, exit is through decision block 52. In either case, stop scan block 58 stops the scanner. Decision block 60 tests again for the presence of a channel acquisition tone and maintains a closed loop if one is present. The presence of a channel acquisition tone as an output from either decision block 52 or decision block 56 also sets latch 62. Decision block 64 tests the status of latch 62 when decision block 72 indicates that push-to-talk (PTT) switch 72 is activated. If the latch 62 is set, exit from decision block 64 is to transmitter enable block 66. Actual keying or activation of the transmitter is by a PTT button located on the portable transceiver. Function block 66 enables the transmitter but does not key it.

Two things may cause the loss of channel acquisition tone at a receiver. Each of these causes is under the control of the terminal which places the channel acquisition tone on the channel next designated for communication. Suppose now that another portable originates a call to the terminal. It will do so on the channel to which it is tuned which is the one that has had the channel acquisition tone. The terminal will acknowledge a valid transaction with that portable unit and will remove the channel acquisition tone from that channel and place it on the next designated channel. Decision block 60 will then respond to the absence of a channel acquisition tone by resetting latch 62, which prevents transmission by the portable unit. Simultaneously, time delay 68 is initiated and decision block 32 tests for the presence of an inbound call or page. Time delay 68 is of the order of three and a half seconds. This is the scan delay time interval during which all units stand by to see if they are called or paged by the terminal before beginning the search for a channel that contains the channel acquisition tone. We have supposed that the channel acquisition tone was lost because another unit has initiated a transaction so that decision block 32 will indicate that there is no inbound call or page. This condition will continue until time delay 68 expires, at which time decision block 70 will cause an exit to reset the scanner through the scan block 46 and will resume the scanning loop that has been described. During the period of time delay 68 the portable cannot initiate a call but can receive a call. If the user attempts to make an outgoing call during that period he will begin by pressing the press-to-talk switch. Decision block 72 will then transfer control to decision block 64 which is receiving an indication from latch 62 that there is no channel acquisition tone. Control will then exit from decision block 64 to busy block 74 which will mute the audio of the radio and generate a busy signal that the user will hear. Muting prevents distortion of the busy signal by received audio. The busy signal will continue until the press-to-talk switch is released. When the press-to-talk switch is released, decision block 76 will transfer control to discontinue busy block 77 and then back to PTT decision block 72.

Suppose now that the receiver is in a continuous loop in decision block 60, receiving a channel acquisition tone. When the terminal places a call to that portable unit channel acquisition tone is removed and a designated identifier is transmitted by the terminal. This identifier is unique to one specific user or group of users. When the channel acquisition tone is dropped, control will exit from decision block 60, latch 62 will reset and decision block 32 will activate the unsquelch radio audio block 34 when the identifier has been received. As before, time delay 68 is also simultaneously initiated when the channel acquisition tone is dropped. Thus the identifier must be decoded before the scan delay interval 68 has elapsed. With unsquelch block 34 active, the receiver audio stages are enabled and audio is presented to the speaker. This audio is selected by the muting block 36. While the alert tones are present, radio received audio is muted and only alert tones are audible to the user. Concurrently with these actions, time delay 38 will also begin and will allow the radio operator a designated amount of time to acknowledge the call. This is normally about 10 seconds.

We have seen that if the user takes no action during the period of time delay 38, squelch block 44 will squelch the audio and the process of scan for a channel acquisition tone will begin. However, if the user presses the PTT button, control passes from decision block 42 to enable block 66 which enables the transmitter. When transmitter enable block 66 and the PTT button are both activated, the radio transmitter will operate. Time delay 78 will also be started when the press-to-talk switch is pressed. This begins a time period of approximately five minutes which the user has to complete his call. In addition to protecting against abuse of spectrum by users, this also assures that a transmitter that is keyed inadvertently will not tie up a channel indefinitely. More importantly, time delay 78 assures that a radio will not be functionally dissociated from the terminal for an extended period of time by accidental keying of the press-to-talk switch. During the time of time delay 78, decision block 80 is testing to see if the reset switch has been pressed. If it has not, decision block 82 tests to see whether time delay 78 has expired. If either the reset switch is depressed or time delay 78 expires, control passes to scan block 46 and the process of scanning the receiving frequencies for a channel modulated by a channel acquisition tone is again started. When reset occurs or time delay 78 expires, the transmitter is disabled by decision block 83, the receiver audio is squelched by block 44, and the logic returns to the scanning mode. Normally, as the last step after a call is completed and the portable unit has disconnected itself from the terminal, the user presses a reset switch to hang up. If he neglects to do this, time delay 78 hangs up for him and the unit is returned to the scan mode to search for a channel that contains a channel acquisition tone. Thus the unit returns automatically to the supervisory mode if not manually reset.

The possibility of using the portable unit as a pager, subject to the control of the terminal, differs from the preceding sequence only slightly. Decision block 32 is activated identically whether for a call or a page. If there is a page, mute block 36 and unsquelch block 34 are activated on a signal from the terminal. From the point of view of operation of the portable, paging is no different from receipt of an incoming call. This is true whether paging is tone only, voice only, or tone plus voice. Differences in coding are functions that are handled at the terminal. The preferred procedure is a matter of design choice in the operation of a particular terminal.

The flowchart of FIG. 2 includes many of the elements of the protocol of a communication system between a portable radio-telephone and the commercial telephone system through a terminal. The protocol is the functional statement of the operating features of the system. For clarity a brief summary of the protocol is provided here. A portable unit will scan a plurality of channels until channel acquisition tone is received. Scanning will then stop. It is by this means that channel selection is automatic. A guardband improves the efficiency of the scanning operation. If the unit is to be the object of a call the channel acquisition tone will be discontinued and the terminal will transmit the unique identifier of that portable unit. When channel acquisition tone is lost, all portable units will remain on the channel for a scan delay interval before resuming scanning. It is during this scan delay period that the portable unit will decode the identifier sent by the terminal. A unit so called will alert the user audibly to the presence of an inbound call. The call may be answered or ignored and the portable unit is capable of automatically selecting the proper time interval allotted for each situation before automatic reset occurs. The portable unit normally resides in a passive mode, as discernible to the user, where no radio audio is present and monitoring is not possible. Since the controling logic is supervising the status of the portable unit, this is called the supervisory mode. The reset time delays described allow the portable unit to be out of the supervisory mode for only limited amounts of time. User-originated calls are permitted only while channel acquisition tone is present. In the absence of channel acquisition tone, the portable unit will generate a busy signal if the user attempts to originate a call and the unit will not transmit. When a portable unit originates a call, the terminal is required to move the channel acquisition tone to the channel next designated for communication. This may be done after identification of the portable user or immediately upon receipt by the terminal of an RF carrier. The latter approach is likely to be more desirable during busy calling periods. If one portable calls another, the terminal may be operated to return channel acquisition tone to the channel taken by the calling portable until the called portable can answer.

The portable includes automatic number identification (ANI) and uses a dual-tone, multiple-frequency (DTMF) encoder, both to establish ANI with a terminal and to place telephone calls, either through the commercial telephone system or, through the terminal, to another portable. Furthermore, the portable unit features a manual reset that is equivalent to hanging up the telephone and serves to allow the user to return the unit to the supervisory mode. By contrast, the automatic reset functions, inbound call answer time and maximum call time are default operations provided to safeguard the integrity of the system. Finally, when a user acquires a channel for either inbound or outbound communications, it is a matter of design choice how the portable unit is required to identify or dial a phone number. The most likely choice for originating calls from a portable unit is first to send ANI which the portable can do only if a designated channel is available. The user then listens for a dial tone, which the terminal will transmit when a portable unit has been recognized, and the user then dials the phone number he is calling. During busy periods it save time if the user is recognized upon keying without waiting for ANI. In either case, interconnection to the commercial phone system is accomplished by the terminal and the exact procedure for doing such is a matter of design choice.

The portable telephone can be used as a pager by enabling its alert tone and, if desired, also broadcasting a voice message under control of the terminal. It is a matter of choice of terminal operation whether the operator wishes to permit the portable user to respond to a page. That choice is with the terminal because the portable unit cannot distinguish between an inbound call and a page. Thus, the user must follow designated procedures that let him make the distinction.

Other options, such as voice-operated transmission (VOX) by the portable unit and the like, present alternative ways of operating the system. These are matters of choice based on convenience. The same is true with the parts of the protocol that define the terminal. The terminal has four full duplex transceivers, capable of receiving and transmitting simultaneously on any or all of the available channels. The terminal must recognize an ANI signal from a portable unit to decide whether this is a customer it will accept. It must begin timing and billing operations and connect the customer to the land telephone system. It must shift the channel acquisition tone to an available channel either on receipt of an ANI signal or on receipt of a transmission that indicates that a portable user has pushed his PTT button. This, also, is a matter of choice. If paging is to be a feature of a particular system, the terminal must control identification of a paged portable and possibly also transmission of an audible signal that enable the user to distinguish between an inbound call and a page. The terminal broadcasts an identification signal that is encoded to select a particular portable, and the terminal broadcasts a tone that is equivalent of a ring. The terminal also times the period of 10 seconds that is allowed for the user to respond to the ring by pressing his press-to-talk button and supplying his ANI code if that is part of the answering protocol. If calls between portables are likely to be frequent, it may be desirable to distinguish such calls from through calls so that they can be intercepted and re-routed at the terminal, and not establish connection with the commercial telephone system. In the alternative, calls between portables can be placed through the commercial telephone system as though the called portable were at a fixed location.

Figure 4:
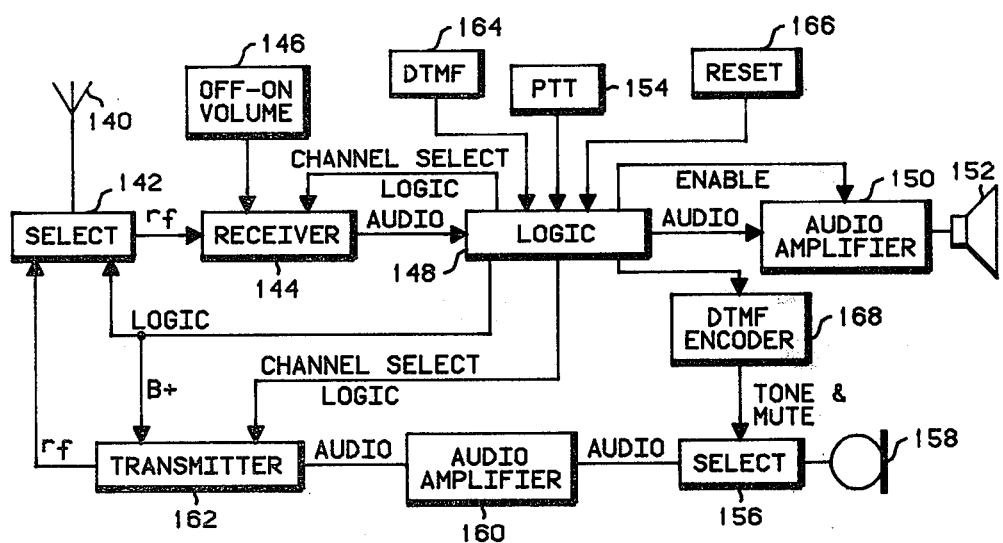
FIG. 4 is a functional block diagram of the logical portion of the portable transceiver of the present invention.
Figure 3:
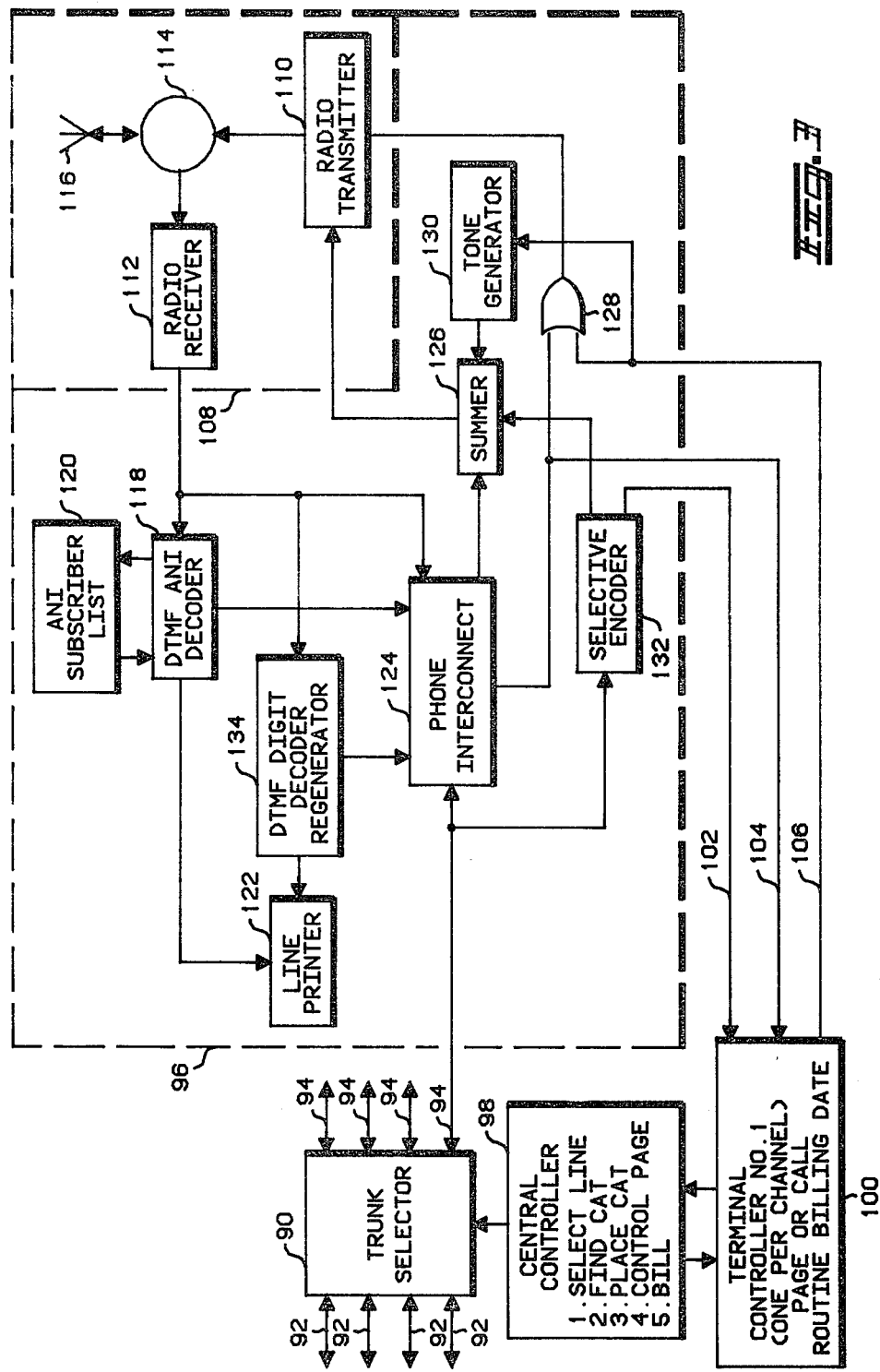
FIG. 3 is a functional block diagram of a terminal of the present invention.
Figure 5A:
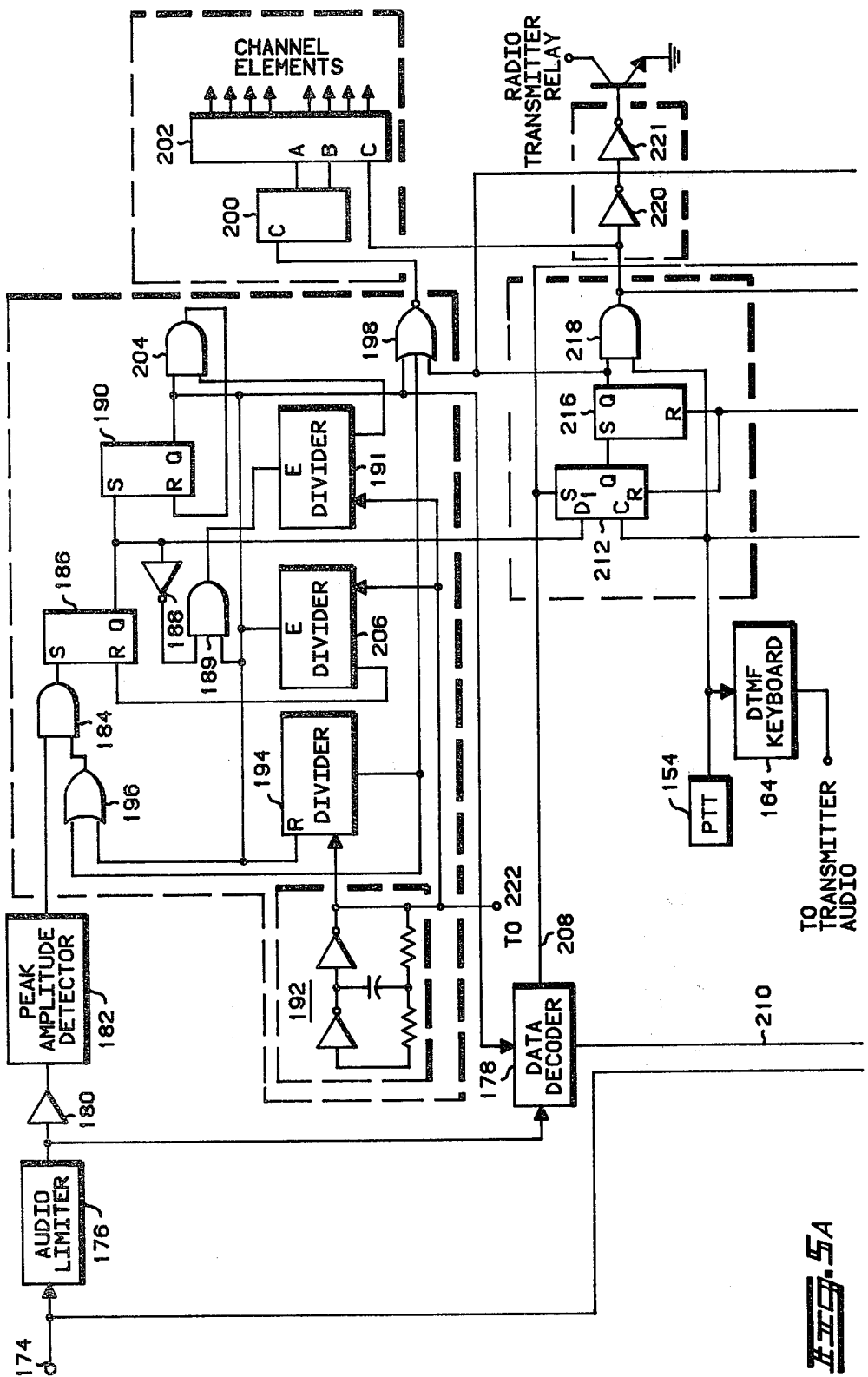

The structure of a system to practice the protocol that has just been described is contained in FIGS. 3, 4 and 5. FIG. 3 is a functional block diagram of a terminal. FIG. 4 is a functional block diagram of a portable transceiver. FIG. 5 is a detailed gate realization of the block marked "logic" in FIG. 4. Interconnection between FIGS. 3 and 4 occurs only by means of radio broadcasts that are transmitted and received. However, certain functions in FIG. 3 are controlled from FIG. 4 and vice versa. For this reason, FIGS. 3, 4 and 5 will be described together.

In FIG. 3 a trunk selector 90 is shown as having four lines 92 that are connected to the land telephone system. The use of four lines is for illustration only as it is evident that an RCC operator will normally be limited by the number of broadcast channels that he can obtain. Considerations of economy or efficiency may cause the operator of the terminal to use more or fewer lines, to use dedicated inbound lines, dedicated outbound lines, or a combination of the two as necessary to serve traffic. Trunk selector 90 enables the appropriate interconnection of any of the inbound lines 92 to any of the lines 94 that serve each individual channel terminal 96. A central controller 98 controls trunk selector 90 and also controls each terminal controller 100, of which there will be one per channel. Only one channel terminal 96 and only one terminal controller 100 are shown in FIG. 3 for purposes of clarity. Channel terminal 96 receives its own telephone line 94 from trunk selector 90 and has three lines of interconnection with terminal controller 100. Of these, line 102 indicates to terminal controller 100 that a user number code has been received at channel terminal 96 over its telephone line 94. Line 104 indicates to terminal controller 100 that an ANI identifier has been decoded at channel terminal 96. Line 106 directs channel terminal 96 to apply a channel acquisition tone to its transmission. Selection of the channel to receive a channel acquisition tone is accomplished by central controller 98. The particular set of lines 102, 104 and 106 includes the assumption that the channel acquisition tone wil not be removed from a channel until the terminal has recognized a caller as a subscriber. Variations in this aspect of the protocol might lead to a need for different control lines between channel terminal 96 and terminal controller 100. In the particular embodiment of FIG. 3, an RF repeater section 108 includes a transmitter 110 and a receiver 112, both connected through a duplexer 114 to an antenna 116. Transmitter 110 and receiver 112 will normally be tuned to different frequencies that are fixed for a particular installation. The system permits simultaneous transmission by transmitter 110 and reception of signals by receiver 112 and hence is duplex operation.

Consider first a received signal from a portable transmitter. The signal is received on antenna 116 and connected through duplexer 114 to receiver 112. The beginning of such a transmission will normally comprise broadcast of ANI information to allow a decision at channel terminal 96 whether the call is from a paid subscriber. Such information is taken to ANI decoder 118 where the ANI signal is checked against ANI subscriber list 120. If the call is approved, subscriber identification is taken to line printer 122 for listing, and a signal from ANI decoder 118 enables phone interconnect 124 to complete a connection with a telephone line 92. If there is a free line 92, a dial tone from the telephone system will be coupled through summer 126 to transmitter 110 for broadcast to the portable unit. If all lines 92 are busy, then a busy signal will be coupled from trunk selector 90 through phone interconnect 124, summer 126, radio transmitter 110, duplexer 114 and antenna 116 to broadcast a busy signal that is received by the portable unit. The user of the portable unit can distinguish this busy from the busy signal that he gets when all channels are taken becaue this busy signal is broadcast from the terminal while the busy signal he gets when all channels are taken is generated in the portable unit when the PTT button is pressed.

Three other features of operation of the channel terminal 96 according to the protocol described earlier are visible in FIG. 3. The first of these involves interconnections of OR gate 128 which provides a logical signal to transmitter 110 to enable its operation. OR gate 128 enables operation of transmitter 110 either in response to a signal from phone interconnect 124 indicating that a conversation is to be broadcast or in response to a signal on line 106 that instructs the transmitter to broadcast the channel acquisition tone. The same signal is taken to tone generator 130 which generates a channel acquisition tone in response to the control signal and feeds that tone through summer 126 to transmitter 110. The third mode of operation is terminal outbound calling or paging to a portable unit which is initiated by an incoming call from trunk selector 90. The selective calling encoder 132 addresses the phone line 94 and electronically obtains the identity of the portable unit to be called. This generally requires that the caller dial the number of the unit with which communication is desired. The selective calling encoder 132 is capable of generating the unique unit identifier of the portable unit and this identifier is presented to the radio transmitter 110 through summer 126 as modulation for an RF carrier. A logic signal identifying the fact than an inbound landline telephone request is being processed to call a portable unit is coupled to terminal controller 100 through line 102. The controller 100 will signal the central controller 98 of its status and will coordinate the portable calling procedures. For purposes of coordination, terminal controller 100 monitors and effects changes on the remaining control line 106. When the selective calling encoder 132 has received the proper information, a logical signal will appear at control line 102. This indicates the beginning of the encoding procedure. Consequently, control line 106 will be affected and the channel acquisition tone will be removed. Status line 104 will now notify the contoller in the event that the portable unit responds to the unique unit identifier which has just been broadcast. If the portable unit answers within the designated time, controller 100 will detect a change on control line 104 when the portable unit has sent a valid ANI code to decoder 118. If the portable unit does not answer in time, controller 100 will signal central contoller 98 that the channel is available for use. The functions performed by the terminal of FIG. 3 are those that are consistent with the protocol described earlier. It has been noted that that protocol is in part a matter of choice of the operator of the RCC or other system that uses the terminal and portable unit of the present invention. Other operating considerations might have dictated a different selection of parameters for placement in and control by the terminal of FIG. 3. The functions that are performed by the elements of FIG. 3 represent one useful choice of functions that can be performed by such a terminal.

FIG 4 is a functional block diagram of a portable transceiver for the practice of the present invention. In FIG. 4 an antenna 140 is both a transmitting antenna and a receiving antenna, depending upon the operation of selector 142. However, selector 142 does not permit multiplexing so that the transceiver of FIG. 4 is limited to simplex operation. This again is a design choice, but one that is consistent with the requirements of lightness of weight and limited energy usage that are necessary for battery-powered portable transceivers. Assume first that a signal is being received by antenna 140 of FIG. 4 and that selector 142 has been operated to pass an RF signal to receiver 144. As described before in the description of the protocol, receiver 144 will have been turned on and set to a proper volume level by on-off-volume control 146. A received RF signal is converted by receiver 144 to audio which is representative of the modulated information on its carrier. The recovered audio signal is coupled to logic element 148, which will be described in detail in FIG. 5. In FIG. 4, it functions as a controller, enabling both the receiver audio and the transmitter when appropriate conditions of the protocol are met. Under these conditions, a desired audio signal passes to audio amplifier 150, thence to speaker 152 to be heard by the user of the portable transceiver. Under the same conditions, when the user is engaged in a call and wishes to speak, he will push the push-to-talk button 154. This will cause logic unit 148 to operate selector 156, connecting microphone 158 to audio amplifier 160. The amplified audio modulates transmitter 162 which is under the control of logic unit 148. The RF output of transmitter 162 is coupled to selector 142 which, under the control of logic unit 148, connects transmitter 162 to antenna 140 to broadcast a signal to the terminal. As described in the protocol, if the user of the portable transceiver of FIG. 4 wishes to initiate a call, he pushes push-to-talk button 154 and then follows a prescribed identification procedure using DTMF encoder 168. DTMF encoder 168 is activated through DTMF keyboard 164 and is capable of sending a programmed burst of DTMF digits which identify the user to the terminal. This is called ANI, Automatic Number Identification. When the user has established such identification, the protocol calls for him to send the phone number of the landline station he is calling. This is accomplished through DTMF keyboard 164 which activates DTMF encoder 168. The signal may be improved at the terminal by DTMF decoder and regenerator 134 of FIG. 3. At the completion of the call the user activates the DTMF keyboard, either to disconnect manually or to initiate an ANI sequence to disconnect. The terminal will then end the call. The user then resets the portable unit by pressing the reset 166. As stated earlier, logic unit 148 includes means for making a reset automatically after a predetermined time if the user does not push reset button 166.

Further details of logic element 148 can be seen in FIG. 5 which is a representation of a gate realization of logic element 148 in FIG. 4. In FIG. 5, audio from receiver 144 of FIG. 4 enters FIG. 5 at terminal 174. This audio is applied to audio limiter 176 which puts the audio signal received at terminal 174 into limit. The output of audio limiter 176 is coupled to inbound data decoder 178 and to narrowband filter 180. Narrowband filter 180 is tuned to the frequency of the channel acquisition tone so that it will pass that tone and essentially nothing else. The output of narrowband filter 180 is coupled to peak amplitude detector 182 which generates logical pulses at one input to AND gate 184 whenever the channel acquisition signal has been applied at terminal 174.

An output from AND gate 184 requires knowledge of the present state of the subsequent logic. Thus, some initial conditions must be imposed. For these purposes it is assumed that no output exists from narrowband filter 180 and that the system has existed in this state for an extended period of time. This requires outputs from RS flip-flops 186 and 190 to be at logic low levels. RS flip-flop 186 is the principal indicator of the presence or absence of channel acquisition tone and RS flip-flop 190 is equivalent to RS flip-flop 186, but with the addition of a trailing time delay. The significance of these outputs will become apparent. A final condition is that the output of R-S flip-flop 216 be at a logic low level, so that the control logic is in the supervisory mode. In this context, the supervisory mode means that the portable unit is not the object of a transaction, either inbound or outbound. This is consistent with the assumption that the system has been at rest for an extended period of time. Furthermore, these initial conditions are not arbitrary and will be seen to be valid states which the logic can and does occupy under normal operating conditions.

With the initial conditions imposed, divider 206 and divider 191 are not enabled and thence are held reset. In this context reset and enable are functionally logical opposites. Thus, divider 194, not being held reset, is enabled, and provides a periodic output which appears as an input to both NOR gate 198 or OR gate 196. Dividers 191, 194 and 206 all obtain a time base from the common system clock 192 which operates at a fixed designated frequency. When operating, the output of the dividers is a square wave with a period digitally related to that of system clock 192. Under these conditions NOR gate 198 has all inputs simultaneously low, and inverts the output of divider 194. The output of NOR gate 198 generates an input to counter 200 which directs the address selector 202 to enable the next successive frequency-determining element of the portable transceiver, thereby changing the channel to which the unit is tuned. The design of counter 200 is such that its address will change on a positive edge. Thus, the portable unit will change channels on the falling edge of divider 194 output. The function of AND gate 184 is now apparent. When the portable unit changes channels, the output of OR gate 196 is held low for a period equal to half the output period of divider 194, which prevents any output from AND gate 184 for that period. This is the detector guardband, an intentional delay provided to allow receiver transients to settle. The guardband typically has a period of 250 milliseconds. During the remaining half cycle, divider 194 output is at a logic high and OR gate 196 will allow AND gate 184 to transfer any data input from the peak detector 182 to subsequent logic. If no input occurs, divider 194 will continue to operate, and the process will repeat indefinitely.

The process of changing frequency of the portable unit and providing the guardband to prevent falsing from receiver transients generated by the changes is called scanning. The portable unit has a plurality of channels that it will search until the unit acquires a channel marked by the terminal with a channel acquisition tone. It is by this means that channel selection is automatic. When the portable unit has changed channels and the time of the guardband has elapsed, an output from peak detector 182 will be transferred through AND gate 184 without inversion. The output from peak detector 182 is a series of logical pulses which will generate an output from R-S flip-flop 186. The output from R-S flip-flop 186 is coupled to inverter 188 and to R-S flip-flop 190 which is also set by the preceding event. The logical high output from R-S flip-flop 190 initiates several actions. First, the divider 194 is reset and disabled. Next, the output of OR gate 196 remains at a logic high, thus allowing data transmission from peak detector 182 through AND gate 184. Next, divider 206 is enabled, and the output of NOR gate 198 is forced to a logic low to prevent scanning. Finally, output from R-S flip-flop 190 is coupled to both AND gate 204 and AND gate 189. With divider 206 operational, R-S flip-flop 186 will be reset periodically by divider 206. Since the reset period, typically 128 milliseconds, is fixed, the output of R-S flip-flop 186 is a rapid status indicator of the channel acquisition tone. If the channel acquisition tone, nominally 2 kHz, is present, R-S flip-flop 186 will be quickly set again and the reset action will not prevail. If channel acquisition tone is absent, the output of R-S flip-flop 186 will stay low, and the input to AND gate 189 will be high, enabling the divider 191. The output of divider 191 is the scan-delay period, typically 3.5 seconds. Output from divider 191 will appear as an input to AND gate 204 which will reset the R-S flip-flop 190. If the channel acquisition tone is recovered, as it might be after a fade, before the R-S flip-flop 190 has been reset, divider 191 will be initialized and the action will repeat when channel acquisition tone is again lost. If this does not happen, the system will again return to the original condition imposed earlier and the portable unit will begin scanning.

It is because of the scan delay that the guardband contributes to system efficiency. Without such protection against receiver transients, caused when the portable unit changes frequency, the scan interval would be increased from a nominal 500 milliseconds to 3.5 seconds per channel. The periods of the guardband, of the channel acquisition tone status reset, and of the scan time are directly related to the frequency of the system clock 192.

It has been shown that the output from R-S flip-flop 186 is the primary indicator of channel acquisition tone. When the logic decodes presence of this tone, output from R-S flip-flops 186 and 190 become present immediately. The loss of channel acquisition tone is recognized by the logic within 128 milliseconds when R-S flip-flop 186 is reset by divider 206. The reset of R-S flip-flop 190 is delayed about 3.5 seconds after the preceding event. The output of R-S flip-flop 190 is also taken to enable inbound data decoder 178 which is capable of recognizing the unique code preprogrammed in the device, and none other. The scan delay is required for decoding purposes, since the channel acquisition tone will normally be discontinued before transmission by the terminal of a portable unit identifier.

When inbound data decoder 178 is thus enabled, receipt of a signal containing the unique code will produce an output on line 208 and will also produce an audio alert tone on line 210. These outputs are present only for about 1.5 seconds immediately following the decode. The output on line 208 will set D flip-flop 212 and generate an output from OR gate 232 for a brief period. The presence of a signal at the output of OR gate 232 causes audio selector 226 to select the alert tone on line 210 and switch off the recovered audio signal from the receiver on line 238. The output of RS flip-flop 216, which is set by D flip-flop 212, forces the output of NOR gate 198 to a logic low to prevent scanning, enables divider 242, and causes an output from OR gate 240 which will enable the receiver audio stages. The enabling of digital divider 242 will eventually result in reset of RS flip-flop 216 and of D flip-flop 212 by OR gate 214. The operation of the reset logic will be discussed in more detail but has been described in the operating protocol and logical flow chart in FIG. 2. When the momentary output of line 208 returns to a logic low condition, OR gate 232 will cause audio selector 226 to select the recovered audio from the receiver on line 238. Because RS flip-flop 216 is set, OR gate 240 holds the receiver audio stages enabled. Thus, when a portable unit is the object of a call, the user will first hear alert tones from decoder 178, followed by the receiver audio, until RS flip-flop 216 is reset.

If the portable unit is involved in a transaction, whether user-originated or not, RS flip-flop 216 will always be set. In the case of a call from the terminal to the portable, RS flip-flop 216 has been set by line 208 from inbound data decoder 178. By design, all transceiver functions are under the supervision of the control logic of FIG. 4 which determines the validity of user-originated requests for service. As discussed in connection with the protocol, the portable unit cannot transmit unless its control logic has found a designated channel. If it has, an output from RS flip-flop 186 will appear at D flip-flop 212. Pressing the PTT button at the portable unit will then provide a clocking input which will set the flip-flop 212, the output of which sets RS flip-flop 216. As with an inbound call, an output from RS flip-flop 216 holds the portable unit on channel by forcing the output of NOR gate 198 low and enabling divider 242, which will eventually cause the reset of the RS flip-flop 216. These events occur only when the PTT is first activated. While the PTT input is present, the output of AND gate 218 will enable the transmitter relay through buffers 220 and 221 and shift the most significant bit of channel selector 202, thereby enabling the appropriate frequency-determining element of the transmitter. Thus the portable unit transmits on the designated channel. The design of the portable transceiver is such that enabling the transmitter relay turns off the receiver and its audio stages. The portable transceiver is thus a simplex transceiver. While the PTT input is present, AND gate 218 holds D flip-flop 222 reset and prevents generation of a busy signal.

In the previous discussion the user of the portable unit activated the PTT button while the unit was receiving channel acquisition tone on the designated channel. The control logic, being programmed to accept these conditions, enabled the transmitter of the portable unit. In the alternative, if channel acquisition tone is not present or the logic is timing the scan delay, output of RS flip-flop 186 will be at a logic low. Since it is assumed that the portable unit is not the object of an inbound call and that OR gate 214 has at some prior time reset D flip-flop 212 and RS flip-flop 216, the clocking signal provided by activating the PTT button will leave D flip-flop 212 in the reset state, since there is no output from RS flip-flop 186. Consequently, no output will be present from either RS flip-flop 216 or AND gate 218. Buffers 220 and 221, not receiving an input, will keep the portable unit in the receive mode. The D flip-flop 222 is not held reset and NAND gate 224 causes D flip-flop 222 to halve the system clock 192. This is the busy tone which has a frequency of about 1 kHz. The PTT input is also taken to inverter 230 where it assures that RS flipflop 228 is reset prior to the presence of the PTT input. The first positive output of D flip-flop 222 sets RS flip-flop 228 causing an output from both OR gate 232, which controls audio selector 226, and OR gate 240, which enables the audio stages of the receiver. The presence of signal at the output of OR gate 232 causes switch 234 to switch off the recovered audio signal, if any, on line 238 and to select either a busy signal that is the output of D flip-flop 222 or the decoder 178 alert tone on line 210. These conditions will prevail and the portable unit will generate an audible busy signal until the PTT button is released. Generation of the busy signal does not affect operation of the scan logic or the ability to receive an inbound call.

Consider now the manual reset and the automatic reset, performed after a time delay if the former does not occur. The reset logic 256 is a programmable timer capable of producing either one of two possible time delays. The first time interval, the shorter of the two, is the call answer time and is nominally ten seconds in duration. This allows time for the portable user to respond to the audible alert that indicates an inbound call. If the PTT of the unit is activated, this time delay will be extended. When the user presses the PTT button, either to originate an outbound call or to answer an inbound call, the time allowed before reset is extended to about five minutes. Manual reset will override both these time delays.

Whenever a radio is involved in a transaction, RS flip-flop 216 will be set, enabling divider 242, which has two outputs. One output is a level shift after ten seconds and the other is a level shift after five minutes. These two outputs are digitally derived from oscillator 244 which operates at a frequency of 28 kHz. The time intervals mentioned can be modified by changing the frequency of oscillator 244, by changing the taps on divider 242, or both. The shorter time output from divider 242 appears as an input to AND gate 246 and the longer interval is used to set RS flip-flop 248. Initial power-up has caused RS flip-flop 250 and RS flip-flop 248 to be reset. In response to an inbound call, RS flip-flop 250 is set, resulting in an output from OR gate 254. The other input to AND gate 246 will go to a logic high ten seconds later and cause OR gate 214 to reset RS flip-flop 216 and D flip-flop 212. If the user responds within the allotted ten seconds, OR gate 252 will reset RS flip-flop 250. This is possible because line 208 has only a momentary output. Ten seconds later only the divider 242 input to NAND gate 246 will be high. Five minutes later, output from divider 242 will set RS flip-flop 248 causing an output from OR gate 254. Another ten seconds later both inputs to AND gate 246 are high, causing an output. The output of OR gate 214 resets not only RS flip-flop 216 and D flip-flop 212 but RS flip-flops 250 and 248 as well, so that this is the only time-stable state of these devices.

If the user originates a call, the action is similar. Divider 242 is enabled by RS flip-flop 216. RS flip-flop 250 does not change state and has no output and RS flip-flop 248 is set five minutes after initial PTT activation. Ten seconds later AND gate 246 has an output which will cause OR gate 214 to reset the logic as previously described. The actual system time allowed to complete a radio transaction is thus five minutes, ten seconds.

FIG. 6 is a detailed circuit diagram of a circuit that has been built and used successfully to practice the present invention, and FIG. 7 is a layout key for the separate sheets of FIG. 6. The circuit of FIG. 6 is the logic portion of the circuit of FIG. 4 that was added to an existing transceiver which was thereby modified to practice the present invention. The circuit of FIG. 6 includes various DC blocking capacitors and RF decoupling capacitors that will not be described where their function is believed to be obvious. A signal taken from a receiver is applied to the terminal 270 of FIG. 6. This is the radio receiver recovered audio and is put into limit by the audio limiter 271. After DC blocking and RF decoupling, it is applied to active filters 272, 344 and 346 which exhibit bandpass characteristics and are tuned to designated frequencies. These filters are narrowband and essentially reject all signals other than those to which they are tuned. Active filter 272 is connected to peak detector 274, and the combination of these two elements form a matched filter, the characteristics of which are optimized for the detection of channel acquisition tone. The output of peak detector 274 normally resides in a logic high state and when channel acquisition tone is present is a series of negative-going pulses. The process of converting the analog signal from the receiver to a digital signal is performed here, and the output is coupled to NOR gate 276. As noted in the analogous discussions concerning FIG. 5, knowledge of the output of NOR gate 276 requires corresponding knowledge of the present states of the subsequent logic. Thus, initial condition must be imposed. The same initial conditions as before will be applied. Therefore, it is assumed that no output exists from active filter 272 and that the system has existed in this state for an extended period of time which, in turn, requires that JK flip-flops 278 and 288 be in a reset state (Q outputs low). Finally, assume that the portable unit is not the object of a transaction, either inbound or outbound. Consistent with initial assumptions of a system at rest JK flip-flop 290 will be in a reset, state.

With these conditions imposed, programmable timer 282 has an output period corresponding to the scan rate, in this case 512 ms. The scan-rate interval is digitally derived from an RC oscillator which is part of programmable timer 282 and is called the system clock producing an output on line 284. The system clock runs at a fixed frequency of 2 kHz. The output from programmable timer 282 is inverted by NOR gate 286 and clocks the counter 298 with a positive edge thereby changing the address of the channel selector 300, and hence the channel to which the portable unit is tuned. On this same positive edge, the output of NOR gate 276 is forced low for 256 ms, providing the detector guardband described in the logical flowchart of FIG. 2 and the gate representation of FIG. 5, both of which define the operating protocol of the system. The detector is thereby guarded against receiver transients when the portable unit changes channels. For the remaining half cycle, 256 ms, NOR gate 276 does not inhibit data transmission, if any, from peak detector 274. If no channel acquisition tone is present, this process will repeat on the next successive channel and those that follow. This process is collectively called scanning, and the portable unit will scan a plurality of channels repeatedly, if necessary, until a channel marked by channel acquisition tone is encountered. When this occurs, the negative-going pulses from peak detector 274 will be inverted at the output of NOR gate 276. The output from peak detector 274 is a pulse sequence with a repetition rate equal to that of the channel acquisition tone. It will initially set JK flip-flop 278 and repeatedly resets the 4-bit counter 280. When JK flip-flop 278 is set, its output sets JK flip-flop 288, changes the divisor of the programmable timer 282 to a smaller integer, and thus causes a decrease in output period from 512 ms to 128 ms. The output from JK flip-flop 288 prevents scanning by holding the output of NOR gate 286 low while its other output, line 292, allows NOR gate 362 to couple any output from the inbound data decoder 343 to the subsequent logic. Once set, JK flip-flop 278 and JK flip-flop 288 can be reset only by a clocking signal from the 4-bit counter 280. This counter is repeatedly reset by the pulse output from NOR gate 276, so a reset condition of JK flip-flop 278 cannot prevail while channel acquisition tone is being detected. When the channel acquisition tone is lost, the 4-bit counter 280, which is triggered on a negative edge by programmable timer 282, will reset JK flip-flop 278 within 128 ms of disappearance of an output from active filter 272. The first state of counter 280 is now occupied, and programmable timer 282 is again running at a 512-ms rate. Scanning cannot resume until JK flip-flop 288 is reset, thereby releasing NOR gate 286. For this to happen, the eighth state of counter 280 must be filled. If channel acquisition tone is not recovered, the remaining seven states of counter 280 will be filled in about 3.5 seconds causing a clocked reset of JK flip-flop 288 to occur. The 3.5 seconds required before JK flip-flop 288 is reset is the scan-delay period.

Prior discussions of the logical flowchart, FIG. 2, and of the logical implementation, FIG. 5, have illustrated the basic operating protocol of the system. It has been shown that the portable unit is capable of supervising its own operation. The user of the unit is unaware of any internal operation of the logic itself, nor need he be since the portable unit will present an audible alert in the event of an inbound call or a busy signal if a designated channel is not available when the user activates the PTT button. Thus, unless the portable unit is the object of a transaction, either inbound or outbound, the control logic of FIG. 4 is in a mode referred to as supervisory. The supervisory mode is the normal state of the portable unit except for two situations: (1) from the time of pushing PTT and not getting a busy signal to reset; (2) from alert tone, indicating an incoming call or page, to reset. In the implementation used to practice the invention of FIG. 6, the mode J-K flip-flop 290 is the principal indicator of the mode of the control logic, and its state determines what the portable unit can do.

Consider now how the portable unit alerts the user to an inbound call. Inbound data decoder 343 is a two-tone sequential decoder capable of recognizing its own unique identifier. The identifier transmitted by the terminal consists of two sinusoidal waveforms sent sequentially. The conditions required for decode are the proper frequency, proper sequence and, to a lesser extent, proper duration of the two-tone burst. The inbound data decoder of each portable unit is programmed by the selection of active filters 344 and 346. When decode occurs, AND gate 354 will have a logic high output, and tone oscillator 360 will generate an alert tone on line 361. These conditions will prevail until the second tone is discontinued at the conclusion of an identifying signal originated by the terminal. Decoder 343 is a general function block that will be discussed later. Output from decoder 343 is coupled through NOR gate 362 which is enabled by line 292 while the portable unit is tuned to a designated channel marked with channel acquisition tone and also during the 3.5 second scan delay thereafter. Under these conditions, output from inbound data decoder 343, will be transferred through OR gate 364 to subsequent logic. The output of the decoder 343 is gated because the receiver scans a plurality of channels searching for channel acquisition tone and while doing so encounters noise, voice information, undefined tone information, or combinations of these, any or all of which might cause falsing. Decode occurs during the scan delay interval since channel acquisition tone is discontinued before transmission of a portable unit identifier by the terminal. The output from OR gate 364, which is representative of the output of decoder 343, is present only momentarily since line 292 will not permit an output after the 3.5-second scan delay has expired. By design, the portable unit identifier must be completed before the scan delay has expired if the unit is to recognize its unique code. The time required to transmit the identifier should be significantly shorter than the scan delay time. If the format of the identifier is correct, decode will occur and OR gate 364 will set the mode J-K flip-flop 290, initiating a sequence of events. The output of NOR gate 286 will be forced low to prevent clocking of counter 298 which disables the scanning function. JK flip-flop 308 will be set, and exclusive NOR gate 324 will prevent a simultaneous reset input to JK flip-flop 308. Output from JK flip-flop 308 will cause audio selector 334 to switch off the receiver recovered audio from terminal 270 and select the alert tone on line 361. Also, a clocking signal provided from exclusive NOR gate 310, acting as an inverter of the system clock on line 284, will clock JK flip-flop 312 to a set condition shortly after decode. In addition, whenever the control logic leaves the supervisory mode, several events will occur which are identical for inbound calls and user-originated calls.

The mode J-K flip-flop 290 will be set which inhibits output from NOR gate 286 and holds the portable unit on the designated channel until this flip-flop is reset. When JK flip-flop 290 changes state, digital divider 320 is enabled and causes the reset of JK flip-flops 312 and 290 through NAND gate 322 and exclusive NOR gate 316 after the appropriate designated period. The radio audio stages are enabled by NAND gate 328 and squelch switch 330. The output of NAND gate 328 also turns on bias transistor 332 to enable audio preamplifier 342. Audio from the audio selector 334 is buffered by amplifier 340 and then amplified by the audio preamplifier 342 whose function is to shape the receiver audio response. The audio output appears at terminal 368, to be amplified by the receiver audio power amplifier and heard by the user of the portable unit. In response to an inbound call, the alert tones on line 361 will be heard until the momentary output of OR gate 364 returns to a logic low when the scan delay expires or before. When the momentary output has gone, exclusive NOR gate 324 will reset both JK flip-flop 308 and JK flip-flop 314, and audio selector 334 will select on the receiver recovered audio from terminal 270. Thus, the alert tone on line 361 is followed by received audio. It will be shown that JK flip-flop 314 generates a busy tone under the proper logical conditions but is held reset by exclusive NOR gate 324 when an inbound call is decoded. The user of the portable unit has three options in the case of an inbound call. These are to answer the call, to ignore the call, or to push the reset button. Pushing the reset button 318 causes a logical high as an input to exclusive NOR 316 causing it to reset JK flip-flops 312 and 290, returning the logic to the supervisory mode of operation. Ignoring the call results in automatic reset of the mode J-K flip-flop 290 by divider 320 when both inputs to NAND gate 322 are high causing output from exclusive NOR gate 316. Divider 320 incorporates an integral oscillator operating at 28 KHz. The output from divider 320 to NAND gate 322 will occur in a time interval designated as the call answer time, typically 10 seconds. Thus, if a call is ignored, the portable unit automatically returns to the supervisory mode in 10 seconds. If the user decides to answer the call, he pushes the PTT button. This will result in an output from Schmitt NAND 296, which provides both a clocking signal for JK flip-flop 290 and an input for JK flip-flop 312. This clocking signal cannot change the set condition of the mode JK flip-flop 290, but the input to JK flip-flop 312 will result in its reset shortly after the PTT is first activated. The clocking signal for JK flip-flop 312 is obtained from exclusive NOR gate 310, functioning as an inverter of the system clock on line 284. Before an output from NAND gate 322 is possible, the digital divider 320 must first set JK flip-flop 312. The tap from divider 320 which will do this is chosen so that 300 seconds elapse before J-K flip-flop 312 is set. Ten seconds later both inputs to NAND gate 322 will be high, causing a resetting output from exclusive NOR gate 316. Thus when a user responds to a call he extends the time to automatic reset from 10 seconds to 310 seconds.

When power is first applied to the portable unit, a power-up pulse will be generated which appears as an output of OR gate 364. Thus, when the radio is first turned on, the power-up pulse 366 causes the logic to perform in a manner identical to that of decoding an inbound call. Under normal circumstances, the call-answer time interval is used to make an initial adjustment of the volume level of the receiver.

The function of the inbound data decoder 343 has been previously discussed in connection with the way the portable unit receives and processes an inbound call. As noted earlier, the encoding format utilized here is two-tone sequential signaling employing sinusoidal waveforms of specified frequency, sequence and duration to identify a particular portable unit uniquely. Individual portable radios are programmed by selecting plug-in active filters 344 and 346. The use of many active filters tuned to different frequencies and of guidelines for selecting combinations of them provide a capacity for several thousand unique identifiers within this encoding format. Active filter 344 is tuned to the first sinusoidal frequency, tone A, and active filter 346 is tuned to the second, tone B. The operation of inbound data decoder 343 will now be discussed. Suppose now that the proper two-tone identifying signal is received by the receiver of FIG. 6. The demodulated tone information will appear at terminal 270. The audio limiter 271 will then limit the identifying tones which then appear as inputs to active filters 344 and 346. While the first tone, tone A, is present, active filter 344 has an output which is taken to threshold detector 348. In the encoding format utilized, tone A has a duration of 1 second and is followed immediately by tone B with a duration of 2 seconds. The loss of tone A will trigger the 50-ms monostable 350. Meanwhile, in response to tone B, threshold detector 352 will receive an input from active filter 346, and both inputs of AND gate 354 will be logically high. The output of AND gate 354 is the principle indicator of a decoded identifier, and feedback through inverter 355 causes the output to be latched for the duration of tone B. While tone B is present, the astable multivibrator 356 will operate and the tone oscillator 360 will be enabled by AND gate 358. The combination of astable multivibrator 356 and tone oscillator 360 allows the decoder to generate a series of short beeps at the frequency of the oscillator and at the rate of the astable multivibrator. This is the call alert tone and will remain for the duration of tone B.

The user of a portable unit has the capability of originating message traffic, as well as the ability to receive calls. If the proper conditions of the protocol are met, the transmitter of the portable unit will function. In the alternative, if these conditions are not met, the transmitter will not function, and the user will receive an audible busy tone when he pushes the PTT button. Again, the mode flip-flop, JK 290, is the decision-making logic element. To originate an outbound call, the portable unit must be on the channel next designated for communications, the one marked by the terminal with channel acquisition tone. Activation of the PTT button of the portable unit will result in a clocking signal to JK flip-flop 290 from Schmitt NAND 296. If channel acquisition tone is not present, JK flip-flop 290 will have no input from the principal indicator of channel acquisition tone, JK flip-flop 278. JK flip-flop 290, the mode flip-flop, thus remains in the reset state. The output from Schmitt NAND 296, however, also appears at the input to JK flip-flop 314, the busy flip-flop. A clocking signal is always present at JK flip-flop 314 from exclusive NOR gate 310. Under these conditions the JK flip-flop 314 is not held reset and it will divide the clocking signal in half. Since the clocking signal is derived from the system clock, line 284, the busy tone, has a frequency equal to half that of the system clock or about 1 KHZ. The busy tone appears on line 338 as an input to the audio selector 334 and is also coupled to JK flip-flop 308. This flip-flop is clocked directly by the system clock on line 284 and will be set when the busy tone begins. While JK flip-flop 308 is set, the audio selector 334 will switch off the receiver recovered audio from terminal 270, select the busy tone on line 338, and cause an output from NAND gate 328. As a result of these actions, the audio stages of the receiver will be enabled by squelch switch 330, the audio preamplifier 342 will be turned on by bias transistor 332, and the busy tone from amplifier 340 will then be heard by the user of the portable unit. While the PTT is depressed NOR gate 326 prevents the reset of JK flip-flop 308 and the user will hear the busy tone for as long as the PTT remains activated. When the PTT is released the output from NOR gate 326 will allow JK flip-flop 308 to clock back to a reset state and the portable unit will squelch. The operation of the scanner and the ability to receive inbound calls are not affected while the busy tone is being generated.

Suppose now that the user activates the PTT while channel acquisition tone is present. This occurs when a user intends to originate message traffic on the designated channel. JK flip-flop 278 will have a logic high output only while channel acquisition tone is present, as it is. Pressing the PTT button will cause Schmitt NAND 296 to clock mode JK flip-flop 290 to a set condition, forcing the output of NOR gate 286 low to prevent scanning, and causing a change in the output of NAND gate 302. The shift in the most significant address bit of channel selector 300 will enable the appropriate transmitter channel element. Similarly, exclusive NOR gate 304, functioning as an inverter, will turn on the transmitter relay through transistor switch 306. Thus the portable unit transmits while the PTT is depressed and receives when it is released. The design of the portable transceiver is such that while the transmitter is operating the receiver is disabled. In practice, the transmitter relay turns off bias to the receiver circuitry and the receiver audio stages cannot function while the transmitter is in use. As described earlier, the set condition of mode JK flip-flop 290 enables the audio stages through squelch switch 330 and bias transistor 332, which turns on audio preamplifier 342. Consequently, when the PTT is released, the receiver is operative. Exclusive NOR gate 324 holds the busy JK flip-flop 314 reset to prevent the generation of the busy tone, and this, in turn, also keeps JK flip-flop 308 reset. Under these conditions the audio selector 334 will route the radio recovered audio on line 270 to amplifier 340, then to preamplifier 342, thence to the receiver audio stages so that the received audio can be heard by the user of the portable unit. Digital divider 320 has also been enabled and will set JK flip-flop 312 in 300 seconds. Ten seconds thereafter both inputs to NAND gate 322 are high, causing an output from exclusive NOR gate 316. This output is related to the automatic reset function described in the operating protocol and has been previously discussed to show how the unit processes an inbound call from the terminal. Exclusive NOR gate 316 will reset JK flip-flop 290 and JK flip-flop 312, thereby returning the portable unit to the supervisory mode 310 seconds after first pressing the PTT button. As noted before, automatic reset is a default feature and activation of the reset button at any time before automatic reset will reset the logic.

The foregoing description has emphasized structure more than function because the functions that are performed by the circuit of FIG. 6 are those that have been described previously in words as the protocol, in logic as the flow chart of FIG. 2, and in a simplified gate realization as FIG. 5. The circuit of FIG. 6 has been built and used to perform these functions. The flexibility of this circuit will be evident from an examination of some of the components. For example, the protocol called for a 4-channel simplex transceiver. This is evident in the four transmitting and four receiving channels of channel selector 300 which is a 8-bit address selector. If it is desired to make the transceiver responsive to a different number of channels, it is necessary only to change channel selector 300 to one that counts to twice the number of channels and to substitute the different number of channel elements in the radio receiver. If a particular terminal operator wants to use a channel acquisition tone that differs from 2 KHz, he need only change active filter 272 to a value that is consistent with his choice. The identification of a particular unit is made by selecting the center frequencies of active filters 344 and 346. What is in effect a change in the telephone number of the portable unit is made by changing one or both of active filters 344 and 346. If it is desired to use a paging system other than a two-tone pager, it would be a simple matter to add additional filters and conventional associated logic to make the unit responsible to a five-tone or other paging system. Similarly, the function of a telephone switch hook is approximated in this unit by the combination of a push-to-talk switch and a reset button. The push-to-talk switch could equally as well be replaced by a voice-operated transmission control (VOX). The use of a VOX controller is believed to be less desirable than push-to-talk in a portable unit because of the increased probability of accidental keying of the unit which might create a false busy until the unit was reset, either manually or by call time-out. The combination of structure and function disclosed here is relatively resistant to inadvertent triggering.

The portable transceiver will normally remain in its supervisory mode with audio squelched and with the automatic channel scan providing a maximum possible amount of time for the unit to be ready to receive incoming calls and generate outgoing calls. In the supervisory mode the portable transceiver consumes a minimum amount of electrical energy, requires no attention from the prospective user who is carrying it, and stands ready to receive or originate calls for as much time as is possible. The user is not aware of any radio traffic except for incoming calls or pages that are directed to him. If he desires to make a call, he need not monitor traffic or search for an open channel. The transceiver and its circuitry do this for him. If he happens to try to place a call during a period when his unit is either in a scan-delay mode or is scanning, he will receive a busy signal but will not initiate any further time delays. He need only continue to operate the push-to-talk button until he gets the dial tone or other signal that indicates to him that he has a channel and can begin the process of making a call.

We claim:

1. In a simplex portable transceiver tuned to a first channel of a plurality of channels that may contain a channel acquisition tone that is converted to an electrical signal with audio variations and applied to a limiter to produce limited audio, an automatic scanner controlling a change to a second of the plurality of channels, the scanner comprising:

an active filter (272) connected to the limiter, the filter (272) passing a narrow band of frequencies including the frequency of the channel acquisition tone; a peak detector (274) connected to the active filter (272) and responsive to the limited filtered channel acquisition tone to produce negative-going pulses;

a NOR gate (276) connected to the peak detector (274) to produce an output;

a J-K flip-flop (278) connected to NOR gate (276) and set by the output from NOR gate (276) to produce an output in the absence of channel acquisition tone;

a programmable counter (282) set to the output of J-K flip-flop (278) to produce a system clock signal on a line (284) and an output square wave having a period of a shorter time when channel acquisition tone is received and a longer time when channel acquisition tone is not received;

a four-bit counter (280) connected to J-K flip-flop (278), programmable counter 282 and NOR gate (276), counter (280) being clocked by the output square wave of programmable counter (282) and reset continually by the output from NOR gate (276) that indicates that channel acquisition tone is present; and a NOR gate (286) connected to programmable counter (282) to produce an output that prevents scan when the receiver is receiving channel acquisition tone or during a scan delay or use of the transceiver.

2. In a simplex transceiver tuned to a first channel of a plurality of channels that may contain a channel acquisition tone, an automatic scanner controlling a change to a second of the plurality of channels, the scanner comprising:

an active filter coupled to a limiter for selecting a channel acquisition tone;

a peak detector coupled to said active filter and responsive to said channel acquisition tone to produce negative going pulses;

a NOR gate coupled to said peak detector;

a flip-flop coupled to said NOR gate to produce an output in the absence of channel acquisition tone;

a programmable counter set by the output of said flip-flop to produce a system clock signal and having an output square wave with a period of a relatively shorter time when channel acquisition tone is received and a relatively longer time when channel acquisition tone is not received;

a counter connected to said flip-flop, programmable counter and said NOR gate, counter clocked by the output square wave of programmable counter and reset continually by the output from said first NOR gate that indicates that channel acquisition tone is present; and a second NOR gate coupled to said programmable counter to produce an output that prevents scan when the receiver is receiving channel acquisition tone or during a scan delay or use of the transceiver.

3. In a simplex portable transceiver tuned to a first channel of a plurality of channels that may contain a channel acquisition tone that is converted to an electrical signal with audio variations and applied to a limiter to produce limited audio, an automatic scanner controlling a change to a second of the plurality of channels, the scanner comprising:

an active filter coupled to a limiter for selecting a channel acquisition tone;

a peak detector coupled to said active filter and responsive to said channel acquisition tone to produce negative going pulses in the presence of channel acquisition tone;

a first gate coupled to said peak detector;

a flip-flop coupled to said first gate to produce an output in the absence of channel acquisition tone;

a programmable counter set by the output of said flip-flop to produce a system clock signal with a relatively short period when channel acquisition tone is received and a relatively longer period when channel acquisition tone is not received;

a counter coupled to said flip-flop, said programmable counter and said first gate, said counter clocked by the output of said programmable counter and reset continually by the output of said first gate when channel acquisition tone is present; and a second gate with a first input coupled to said programmable counter and a second input coupled to said counter to prevent scan when the receiver is receiving channel acquisition tone or during a scan delay or use of the transceiver.

* * * * *